March 24, 1970     W. C. WHITTUM     3,502,375
BEARING ASSEMBLY
Filed Sept. 6, 1967     4 Sheets-Sheet 1
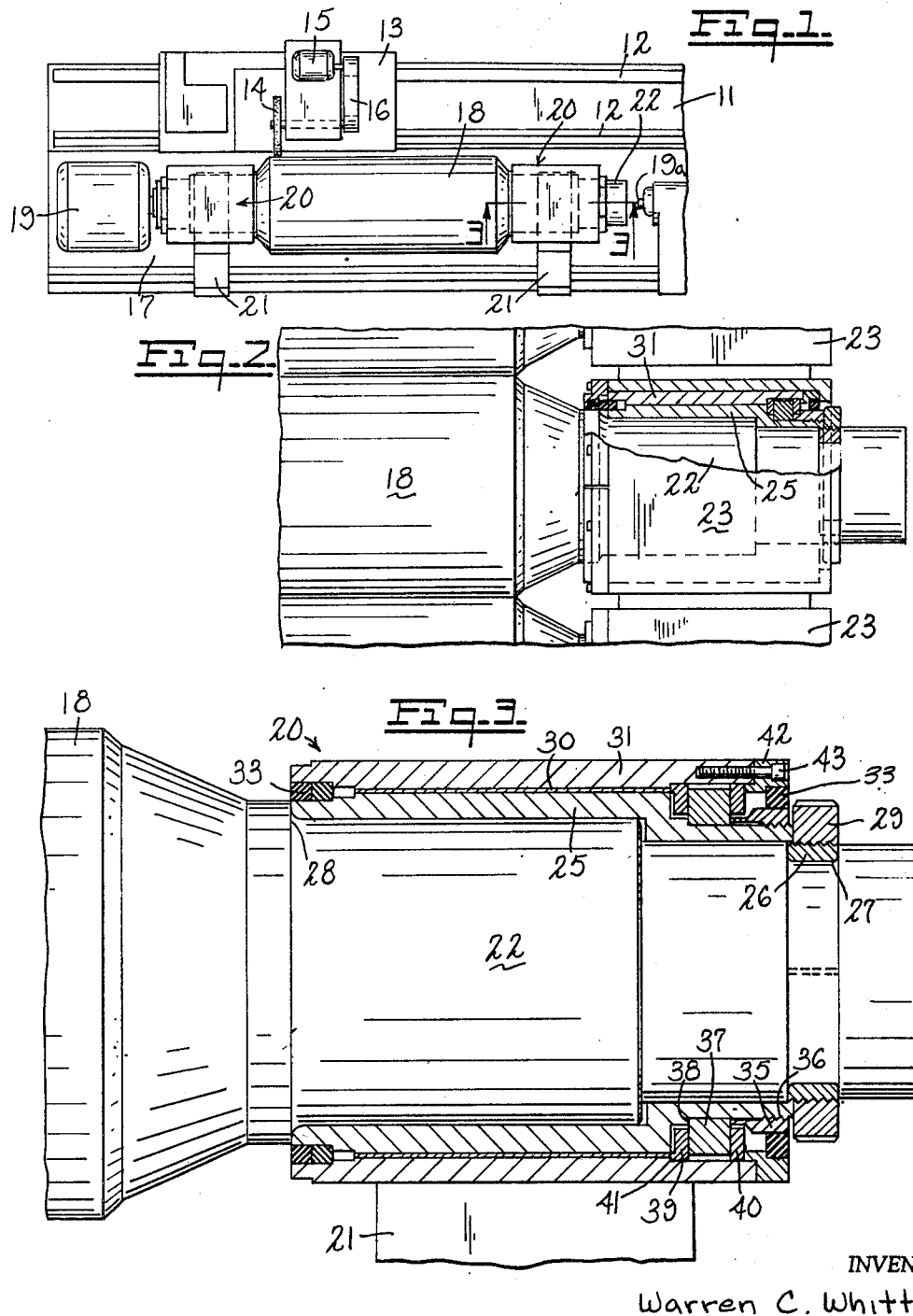
INVENTOR
Warren C. Whittum
BY De Lio and Montgomery
ATTORNEYS

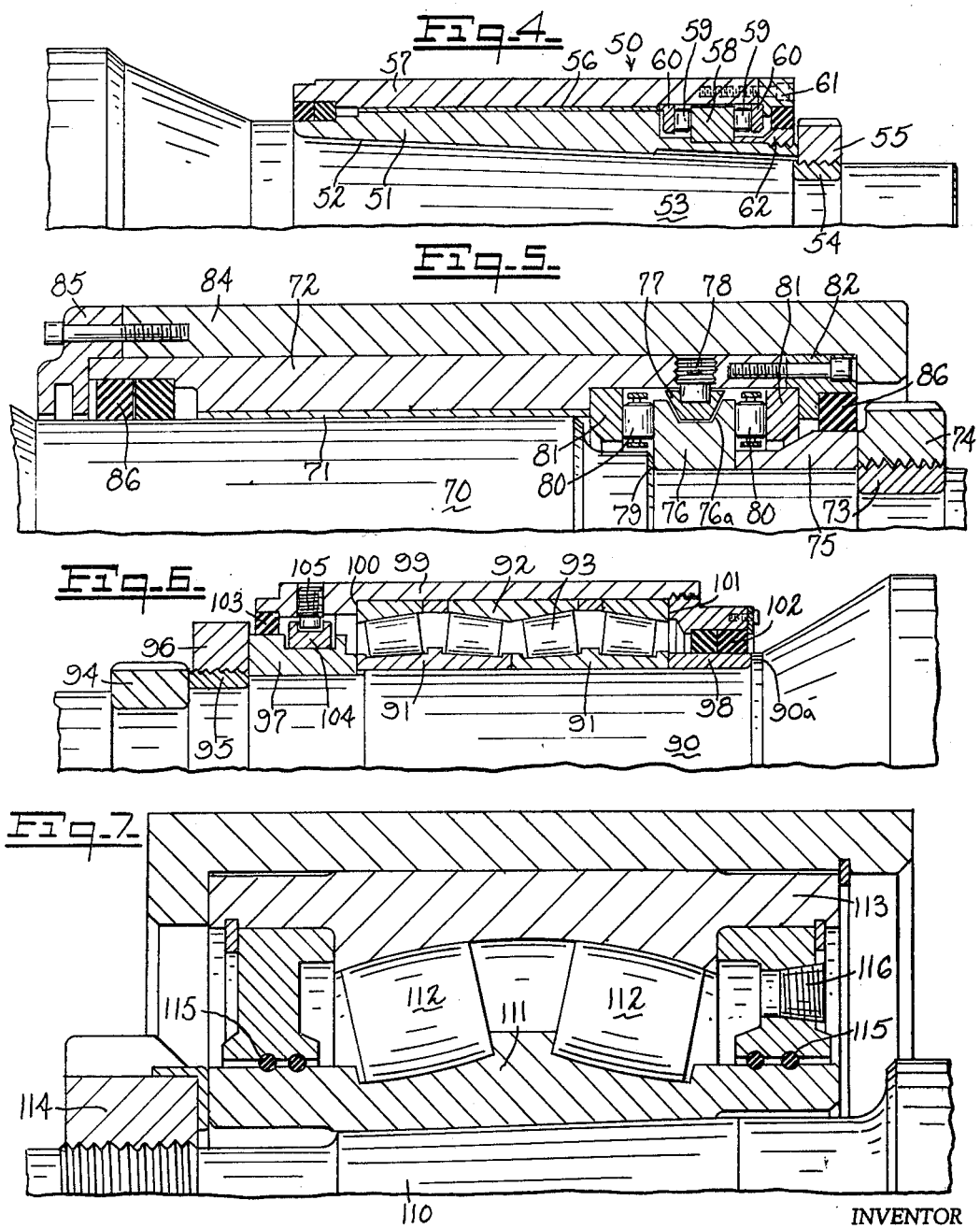

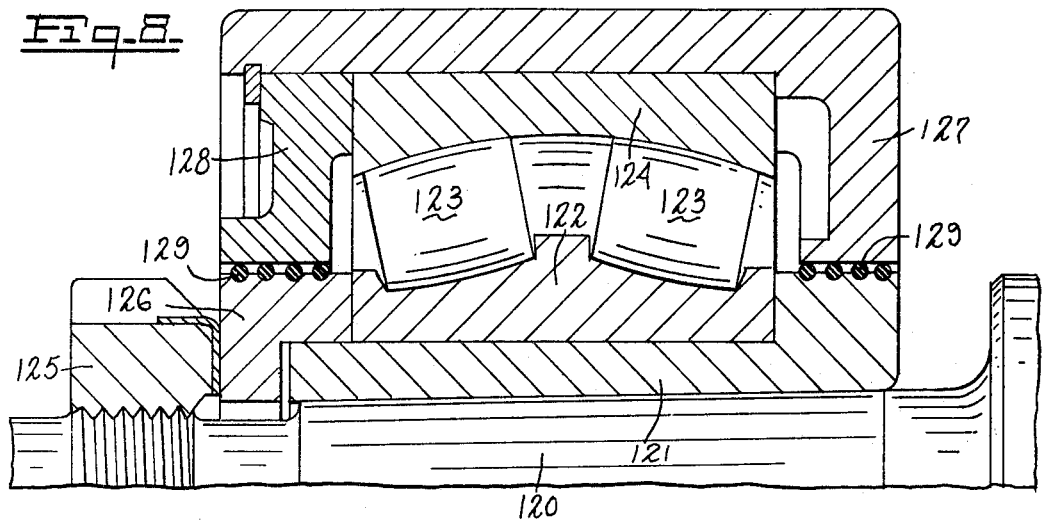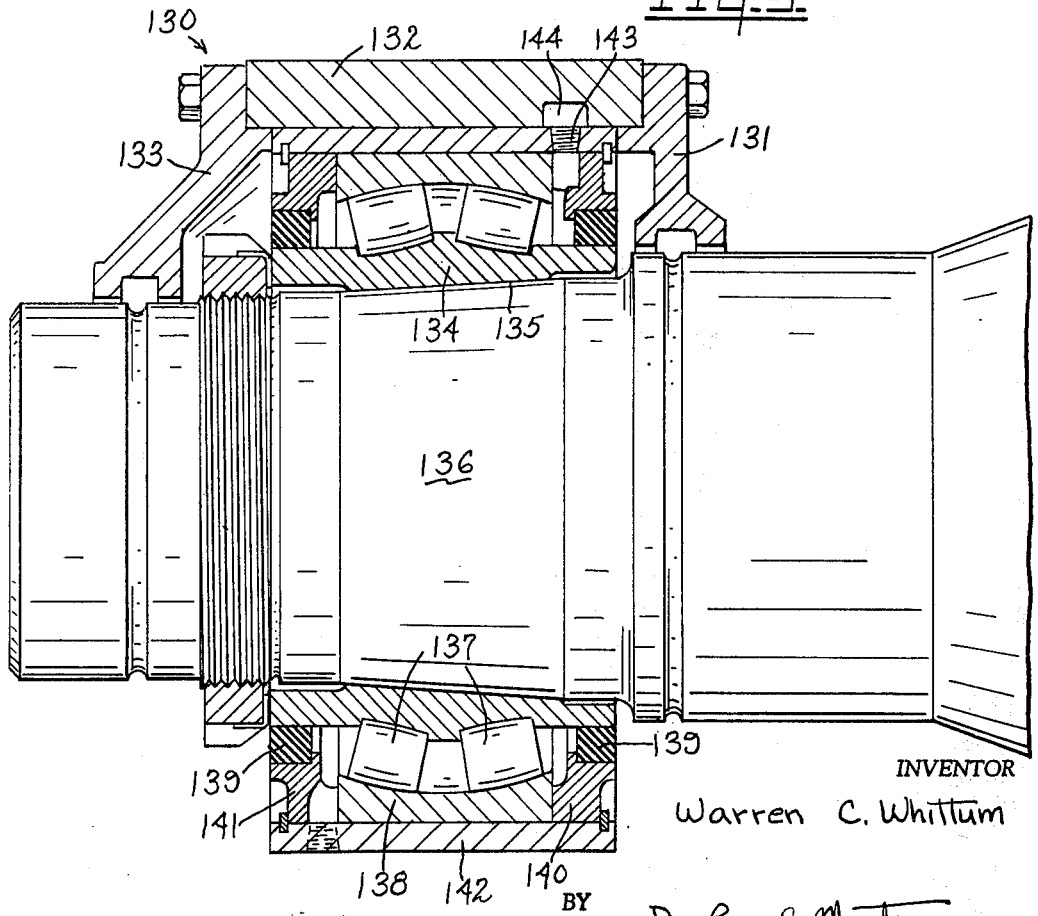

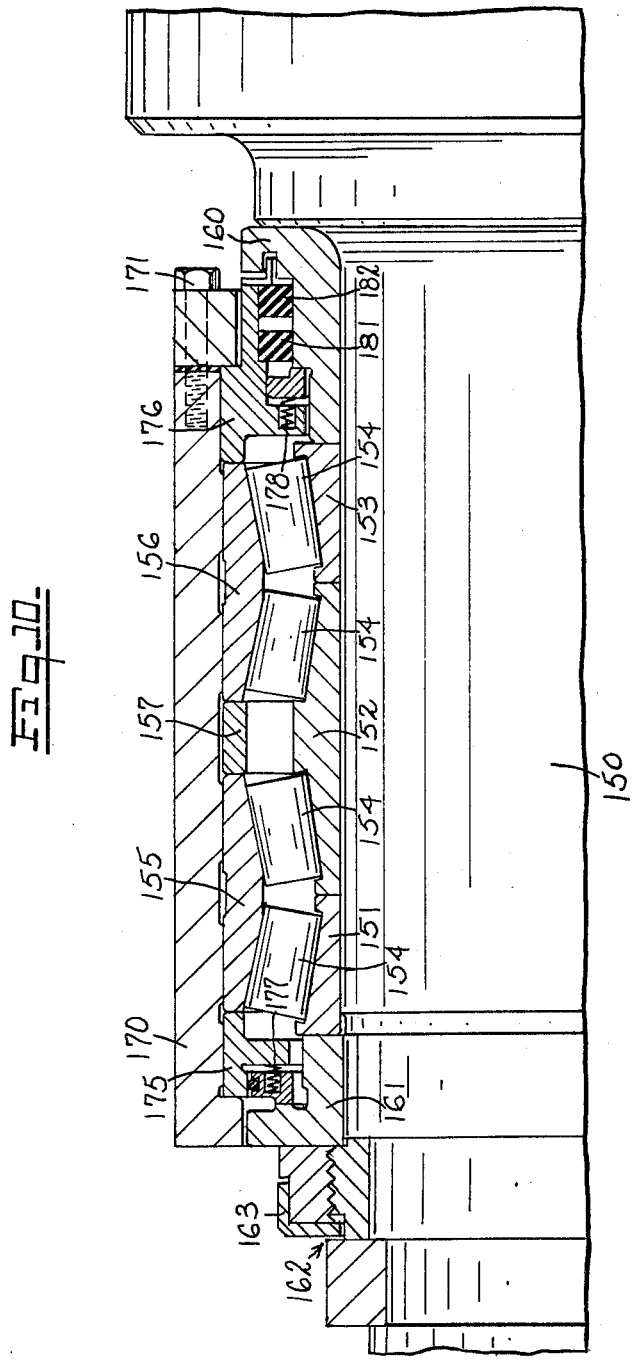

United States Patent Office 3,502,375
Patented Mar. 24, 1970

3,502,375
BEARING ASSEMBLY
Warren C. Whittum, Orange, Conn., assignor to Farrel Corporation, Ansonia, Conn., a corporation of Connecticut
Filed Sept. 6, 1967, Ser. No. 665,856
Int. Cl. F16c 1/24, 33/72; F16r 15/00
U.S. Cl. 308—36.1    5 Claims

ABSTRACT OF THE DISCLOSURE

A bearing assembly for a roll journal or the like, comprising a sleeve, a liner surrounding the sleeve, sealing means between said sleeve and said liner at both ends thereof, and first means attached to the sleeve for axially positioning said liner with respect to said sleeve.

---

A bearing assembly for a roll journal or the like, comprising a sleeve, a liner, sealing means between said sleeve and said liner at both ends thereof, a cavity formed between said sleeve and said liner, and roller bearing means positioned in said cavity between said sleeve and said liner, said sleeve, said liner and said roller bearing means shaped to axially locate the liner with respect to the sleeve.

This invention relates generally to bearing assemblies commonly used on metal and paper rolling machinery and the like and more particularly relates to a sealed cartridge type bearing assembly which can be easily removed from the main chock and thereby left in place on the roll itself without disturbing its mounting on the roll or in any way exposing the bearing surfaces of the bearing assembly.

Rolls which are used in steel and paper mills and other types of mills, become worn and marked through use. When a roll is worn and marked, it can no longer be used in production and it is standard procedure to transfer the roll to a roll grinder, where it may be resurfaced. Each roll in a mill is normally supported by means of its journals which are mounted in bearings in roll journal boxes.

Heretofore, it has been an increasing practice, as disclosed in U.S. Patent 3,227,499, to move the entire journal box and the roll which it supports, to the grinding machine so that the roll may be resurfaced. Although this procedure may be readily followed, it is quite cumbersome and requires provision for awkward shaped chocks which the roll grinding machine cannot easily receive, as indicated by parts 33 and 46 in FIGS. 2 and 4 of the above-mentioned patent. Accordingly, a simplified procedure was required to facilitate the resurfacing of the rolls which would include the provision for solely removing the roll and its associated bearings in a sealed cartridge, preferably round, for subsequent supporting in a roll grinding machine.

It is also a common practice to remove the bearing chocks completely from the roll, so that the roll is supported directly upon its own journals during the grinding operation. In such cases, bearing constructions commonly used, and as illustrated in FIGS. 2-5 of the above-mentioned patent, expose the internal bearing elements to dirt and other contamination and also expose the sealing elements to possible damage during handling. The bearing cartridge herein provided eliminates the exposure of the bearing elements and seals while, at the same time, providing a support structure which the roll grinding machine can readily receive.

In view of the foregoing, applicant has provided a sealed bearing cartridge assembly which is mounted on a roll journal and which may be simply removed from the supporting chock and carried to a support of the grinder. The roll journal need not be placed in any bearings in the grinder and can continue to use its own bearings. The bearings provided by this invention are completely sealed, so that when the bearing assembly is removed from the supporting chocks, the surfaces will continue to remain dirt-free and not be affected by environmental conditions.

Accordingly, it is an object of this invention to provide a new and improved bearing arrangement for supporting the roll in a mill and which may be used for supporting the roll in a roll grinder.

Another object of this invention is to provide a new and improved bearing structure which is removable with the roll itself from the supporting chock and which can be transferred to a support provided by the roll grinder, such that the bearings provided on the roll journals remain continuously in contact with the roll journal and need not be removed therefrom.

Still other objects and advantages of the invention will in part be obvious and will in part be apparent from the specification.

The invention accordingly comprises the features of construction, combination of elements and arrangement of parts which are hereinafter set forth in detail and the scope of the invention will be apparent from the claims.

For a fuller understanding of the invention, reference is had to the following description, taken in connection with the accompanying drawings, in which FIG. 1 is a top view of a roll grinder supporting a roll to be reground, the roll being supported in a sealed bearing cartridge assembly according to this invention;

FIG. 2 is a partial plan view of a roll mounted in the bearing assembly according to this invention, said bearing assembly supported by a roll journal and its associated housing as shown in FIG. 1;

FIG. 3 is a sectional view taken along line 3—3 of FIG. 1, showing the roll and its bearing positioned in the roll grinder;

FIG. 4 is a sectional view similar to FIG. 2, showing another configuration of the bearing cartridge assembly of the invention;

FIG. 5 is still another view, similar to FIG. 2, showing another sealed cartridge assembly according to the invention;

FIG. 6 is a sectional view of a sealed bearing cartridge assembly according to the invention, wherein roller bearings are utilized;

FIG. 7 is a view similar to FIG. 6, showing yet a further embodiment of the invention;

FIG. 8 is another view similar to FIG. 6, showing another embodiment of the invention;

FIG. 9 is a sectional view of still another embodiment according to the invention; and FIG. 10 is a view similar to FIG. 6 showing an additional embodiment according to the invention.

Referring to FIG. 1, a roll grinder 11 is provided with a set of ways 12 on which there is positioned a carriage 13 adapted to traverse the ways 12 in a well known manner. A grinding wheel 14 is suitably mounted on the carriage 13 and is adapted to be driven by a motor 15 by means of a belt 16. A bed 17 is provided parallel to ways 12 for mounting a roll 18 thereon. A motor 19 is mounted on bed 17 for rotating the roll 18 which is to be reground. A center 19a may be provided on the bed 17 or aligning the roll. The roll 18 is supported in the sealed bearing cartridge assembly shown at 20 according to this invention which, in turn, is supported by support member 21 supported on the roll grinder apparatus.

Referring now to FIGS. 1–3, in FIG. 3 there is shown the sealed bearing cartridge assembly mounted on the roll 18 on a journal 22 thereof and supported by the support members 21. FIG. 2 shows the sealed cartridge assembly 20 and its associated roll journal 22 and roll 18 supported on a chock 23, in any suitable well known manner. Since the invention herein does not reside in the manner in which the sealed bearing cartridge assembly is supported by either the chock 23 or support member 21, the means for fastening the bearing assembly to the support member 21 or the chock 23 to its support member is not shown since this is well known in the prior art.

FIGS. 2 and 3 disclose a sleeve 25 mounted on the journal 22 of the roll. The sleeve 25 is held in place on the journal 22 by the provision of a split ring 26 which mates with a cut-out portion 27 formed in the journal 22. The sleeve 25 abuts against a journal portion 28 and is held in place by a nut 29 which threadedly engages the split ring 26. The sleeve 25 rotates with the journal 22 and roll 18 against a bearing liner shown at 30 which is physically attached to a liner element 31. The element 31, as shown in FIG. 2, is supported against the chock 23 or, as shown in FIG. 3, is supported against the support 21. The liner 30 is generally of a softer metal material which will gradually wear as the sleeve 25 rotates against it and which may be replaced. The liner 30 is forcibly retained in the outer sleeve 31 by an interference fit or by other suitable means.

Positioned between the sleeve 25 and the outer sleeve 31 are seals shown at 33 which could be of fiber or rubber material and which completely seal the bearing engaging surfaces against outside dirt or matter and, also, seal in lubricating oil within the bearing assembly.

In order to retain inner liner 30 and outer liner 31 in place without a support, a threaded ring 35 is provided which engages a threaded portion 36 of sleeve 25. The ring 35 also engages ring 37 which abuts a shoulder portion 38 of sleeve 25. The ring 37, in turn, is positioned between two rings 39 and 40, ring 39 having a portion abutting against a shoulder 41 of the liners 30 and 31 and the ring 40 being forced up against the ring 37 by a ring-like member 42 to hold in place against the liner 31 by a bolt 43. One of the seals 33 is actually positioned between the ring 35 and the member 42 in order to seal the entire bearing assembly. As shown, the ring 37 abuts against the sleeve 25 and rotates therewith, whereas rings 39 and 40 remain stationary with the liners 30 and 31 as the roll journal and the sleeve rotate.

Thus, there has been provided a completely sealed bearing assembly, needing no external supports to maintain both the liner and the sleeve portion of the assembly on the roll journal, even when removed from a chock and placed in or on a support in a grinding machine. As disclosed, the liner surfaces are suported in such a manner that they cannot move axially in either direction. This is accomplished with no external chock support members affixed thereto.

Referring now to FIG. 4, there is shown another embodiment of the invention in a view similar to FIG. 3. The sealed bearing cartridge assembly is shown at 50 and includes a tapered sleeve 51 fitting on a tapered portion 52 of the roll journal 53. A split ring 54 is provided on a journal cut-out portion in which is threadedly mounted a nut 55 for holding the sleeve 51 against a shoulder portion of the journal 53. Liners 56 and 57 (as mentioned previously with respect to FIGS. 2 and 3) are provided, it being understood that these liners could be of a single material or of two parts as disclosed in FIG. 4 or, as in FIGS. 2 and 3. The liners 56 and 57 are supported against the sleeve member by a ring 58, rollers 59 and rings 60, as well as by ring member 61 which is bolted to the liner 57. By the provision of a threaded ring 62 threadedly engaging sleeve 51; the ring 58 pushes the roller 59 and the ring 60 against a shoulder portion of the liners 56 and 57 to retain them in place.

Now referring to FIG. 5, there is shown a slightly different embodiment of the sealed bearing assembly of this invention. In this embodiment, the journal is not provided with a sleeve assembly as in the other embodiments so far described. Rather, the journal itself, shown at 70, has its surface bearing directly upon the liner material 71 which is affixed to the outside liner 72. In order to retain he liners 71 and 72 in position, again there is provided a split ring 73 which threadedly supports a nut 74 having a portion thereof for engaging a sleeve 75 positioned on the journal 70 which, in turn, engages an annular member 76. The member 76 has a cut-out 76a formed therein in which is mounted a shoe-like member 77, on which is positioned an adjustable threaded screw 78 for positioning the liners 71 and 72 with respect to the roll journal 70. The member 77 as disclosed herein is of the type disclosed in U.S. Patent 3,227,499, previously mentioned. The member 76 abuts against a shoulder 79 of the journal 70 so that it rotates therewith. To axially hold liners 71 and 72 in place, rollers 80 are provided for engaging ring members 81. The entire assembly is held together by means of a member 82 which is bolted to the liner 72. There is also shown a chock 84 having a split collar 85 bolted thereto. Seals are provided at 86 as shown, so as to provide a completely sealed cartridge assembly.

Referring now to FIGS. 6–9, there are shown roller bearing type sealed bearing cartridge assemblies, rather than the sleeve type previously disclosed and described in FIGS. 1–5. With particular reference to FIG. 6, there is shown a roll journal 90 on which is mounted an inner race 91 (which acts as a sleeve) an outer race 92 and tapered roller bearing 93. The inner and outer races are preferably tapered for retaining the bearings 93 in place and to prevent axial motion of the inner race with respect to the outer race, or with respect to the bearings themselves. The inner race 91 is held in place by a split ring assembly 94 which holds in place a threaded ring 95, on which there is supported a threaded ring 96 engaging a ring member 97. The member 97 abuts against inner race 91 and pushes it against a ring member 98 which, in turn, abuts a shoulder portion 90a of the journal 90. A liner 99 is provided which engages the outer race 92 at 100 and 101 to position the outer race. Between the liner 99 and the ring 97 seals 102 and 103 are provided. A shoe-like member 104 is also provided, with a set screw 105 for adjusting the position of the bearing assembly with respect to the journal during grinding. The configuration of the inner race, the bearings and the outer race of the assembly is maintained axially by their shapes, such that the entire bearing assembly may be removed from the supporting journal chock (not shown).

Referring to FIG. 7, another embodiment of a roller bearing sealed cartridge assembly is shown, according to the invention. In this assembly, the journal is shown at 110, is tapered and mates with a tapered inner race 111. The bearings are shown at 112 and the outer race at 113. The inner race 111 is forcibly pushed against the tapered journal by members shown generally at 114 and seals are provided at 115 by rings, preferably of rubber material or the like. An oil passage 116 is provided, which may be connected to an external source of oil. When the bearing assembly is removed with its journal, the passage 116 may be sealed by a suitable filler or plug in order to completely seal the bearing assembly. As will be noted, again the outer race 113 is of such a configuration that it is axially located except for a slight tolerance.

Now referring to FIG. 8, a different embodiment is shown to that of FIG. 7. A tapered journal 120 is again used, as well as a tapered sleeve member 121. The member 121 supports the inner race 122 for the bearings 123. The outer race for the bearings is shown at 124. The inner race and the sleeve are held in place by the assembly shown at 125 and 126, respectively. Encapsulating collar members are provided at 127 and 128 about the outer race 124. Sealing means are provided at 129, as shown.

Another embodiment of the invention is disclosed in FIG. 9, together with a chock for supporting the sealed bearing assembly of this invention. The chock 130 includes a split member 131 and members 132 and 133. These members form a support for the bearing assembly which comprises a tapered inner race 134 abutting against a tapered portion 135 of a journal 136. Roller bearings are provided at 137 and an outer race at 138. Seals 139 are held in place by members 140, 141 and 142, respectively. Member 142 is provided with an oil passageway opening 143 mating with a passageway 144 to the chock for providing oil to the bearing assembly.

Referring now to FIG. 10, there is shown a further modification of the arrangement of FIG. 6. In this construction, a circular sleeve is not used, as in the case of FIG. 6 but, instead, the outer sleeve surface is that of the outer diameter of the roller bearing elements themselves. More particularly, as shown in FIG. 10, a journal shown at 150 supports a plurality of rings shown at 151–153 which support a plurality of rollers 154 and a plurality of outer rings 155 and 156 separated by a ring member 157. The rings 151–153 and outer rings 155 and 156 form a thrust face for the rollers 154. The rollers and their respective rings supporting the rollers are held in place by ring members 160 and 161 by the use of a nut assembly 162 and retainer ring 163. The entire assembly is held in place on the chock shown at 170 by the provision of a bolt arrangement 171.

In this embodiment, provision is made for clearance between the end portions of the ring or race elements 155–157 when the bearing assembly is supported by the chock. When the journal and bearing assembly are transported to the roll grinder, it is then necessary to eliminate this axial end clearance to prevent dirt and water from entering the bearing. To accomplish this, this construction includes a pair of spring loaded sealing elements shown at 175 and 176 to urge the roller bearing elements 155–157 firmly together, thus eliminating the danger of dirt or water from entering the bearing assembly. The springs for these members are shown at 177 and 178, respectively. In this embodiment, seals are provided at 181 and 182, respectively, for the same purpose as disclosed with respect to the other embodiments of this invention.

The outer liner, i.e. 31, 57, etc., may be either a round element as shown, or may take any other suitable configuration. It should also be understood that the shoe 104 may also be used in conjunction with FIGS. 7, 8 and 9.

This completes a description of the preferred forms of the invention. Other modifications may be made to the constructions set forth above, as will be apparent to those skilled in the art.

It will thus be seen that the objects set forth above, among those made apparent from the preceding description, are efficiently attained and since certain changes may be made in the above constructions without departing from the spirit and scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A bearing cartridge assembly for a roll journal or the like, comprising a sleeve mounted on the journal for rotation therewith, a liner member having a cylindrical outer surface positioned over said sleeve, bearing layer means between said sleeve and said liner, positioning means carried on said sleeve adjacent the free end of the journal for axially positioning said line with respect to said sleeve and a plurality of axial thrust elements disposed between said sleeve and said liner and positioned by said positioning means, first sealing means disposed between said positioning means and said liner at one end of said cartridge and second sealing means disposed between said sleeve and said liner at the other end of said cartridge.

2. A bearing assembly according to claim 1, wherein said sleeve has a shoulder for abutting the journal, wherein the sleeve and liner are formed to provide a cavity therebetween, and wherein said thrust elements comprise a plurality of rings in said cavity and engaging said means for axially positioning said liner with respect to said sleeve.

3. A bearing assembly according to claim 1, wherein said sleeve is tapered, wherein the sleeve and liner are formed to provide a cavity therebetween, and wherein said thrust elements comprise a plurality of rings in said cavity and engaging said means for axially positioning said liner with respect to said sleeve.

4. A bearing assembly according to claim 3, wherein there are provided rollers between said rings, and wherein said rings form the thrust face for said rollers.

5. The bearing assembly of claim 1 wherein said positioning member is an annular member threadably received on the outer end of said sleeve.

References Cited

UNITED STATES PATENTS

| | | | |
|---|---|---|---|
| 2,050,166 | 8/1936 | Dahlstrom | 308—122 X |
| 2,161,768 | 6/1939 | Smitmans | 308—36.1 |
| 2,243,009 | 5/1941 | Kingsbury | 308—36.1 |
| 2,955,001 | 10/1960 | Rich | 308—36.1 |
| 1,726,601 | 11/1929 | Jones | 308—174 |
| 1,765,705 | 6/1930 | Smith | 308—174 |
| 1,774,655 | 9/1930 | Messinger | 308—174 X |
| 1,776,647 | 9/1930 | Zubler | 308—174 |
| 2,018,055 | 10/1935 | Dahlstrom | 308—70 |
| 2,429,516 | 10/1947 | Jergens | 308—187.1 |
| 2,507,204 | 5/1950 | Giern. | |
| 3,336,998 | 8/1967 | Avrea | 308—187.1 X |

MARTIN P. SCHWADRON, Primary Examiner

L. L. JOHNSON, Assistant Examiner

U. S. Cl. X. R.

308—187.1, 187.2, 174